(12) United States Patent
Lau et al.

(10) Patent No.: US 6,262,399 B1
(45) Date of Patent: Jul. 17, 2001

(54) GRILL

(75) Inventors: Wing Chung Joseph Lau, Pokfulam; Leung Chi Ho, Tsuen Wan, both of (HK)

(73) Assignee: Eastern Sources Housewares (Hong Kong) Limited, Hong Kong (HK)

( * ) Notice: Subject to any disclaimer, the term of this patent is extended or adjusted under 35 U.S.C. 154(b) by 0 days.

(21) Appl. No.: 09/392,263

(22) Filed: Sep. 9, 1999

(51) Int. Cl.[7] ............................ H05B 3/68; A47J 37/10
(52) U.S. Cl. .................................. 219/450.1; 99/425
(58) Field of Search ........................ 219/450.1, 452.11, 219/452.12, 454.12, 455.11, 459.1, 458.1, 430, 432, 433, 443, 455, 532, 533; 99/444, 445, 446, 400, 422, 425

(56) References Cited

U.S. PATENT DOCUMENTS

| | | | |
|---|---|---|---|
| 2,820,130 | * | 1/1958 | Dadson ............................. 219/413 |
| 2,833,149 | * | 5/1958 | Aldridge et al. ................. 374/205 |
| 2,850,616 | * | 9/1958 | Hatch ................................ 219/433 |
| 2,914,644 | * | 11/1959 | Holtkamp ......................... 219/413 |
| 3,384,195 | * | 5/1968 | Jepson et al. .................... 219/442 |
| 3,395,266 | * | 7/1968 | Price ................................. 219/433 |
| 3,573,431 | * | 4/1971 | Tyler ................................. 219/516 |
| 5,355,779 | * | 10/1994 | O'Brien et al. .................. 99/446 |
| 5,524,528 | * | 6/1996 | Yeh ................................... 99/446 |
| 5,546,851 | * | 8/1996 | Goto ................................. 99/446 |

\* cited by examiner

*Primary Examiner*—Sang Paik
(74) *Attorney, Agent, or Firm*—Burns, Doane, Swecker & Mathis, L.L.P.

(57) ABSTRACT

The present invention provides an electric cooking grill which provides a cooking surface for grilling and an alternate cooking surface for pan flying. The grill incorporates a temperature controlling element and a temperature measuring probe which allows the user to adjust the temperature according to the level of cooking desired. The temperature controlling element and the temperature measuring probe allow a user to effectively control the cooking temperature which is essential to food safety. The grill also incorporates a number of safety features so that unless all essential features are fully assembled, it is disabled to ensure safety.

34 Claims, 10 Drawing Sheets

GRILL

BACKGROUND OF INVENTION

1. Field of Invention

The present invention relates to a cooking grill.

2. Description of Prior Art

There are a variety of apparatus for cooking meats and other food items. Such apparatus include conventional charcoal, gas and electric grillers and broilers. In some such grills, the grill elements of the cooking surface are modified so as to provide a variety of cooking surfaces. In a popular construction, the grill has an appertured grill surface below which is arranged a drip tray to catch fats and liquids. This construction stops the fats dripping onto the heating elements. This can avoid excessive smoke, which is possibly carcinogenic, being produced.

However, such conventional designs may not address any problem associated with the safety of food cooking and operation of the cooking appliance. Furthermore, conventional electric grills are usually not constructed for easy assembling and disassembling and storage.

The present invention provides an electric grill which can mitigate the drawbacks of the prior arts, or at least provide the public with a useful choice.

SUMMARY OF INVENTION

It is a general object of the present invention to provide an improved food grilling and/or frying apparatus, including, but not limited to, grills and frying pan. In particular, the present invention provides an electric grilling apparatus having a plurality of modular parts.

Grills, frying pans and broilers are used for cooking meats, eggs, vegetables or other food items. Accidents can occur when the user switches on the cooking unit before the appliance is fully assembled and properly operational. It is thus a further object of the present invention to provide an electric grill which will only operate when the residue collecting pan or drip tray is fully fitted into the ledges of the cooking grill.

Food safety is another concern. As food contamination is not uncommon nowadays, it is important to cook the food thoroughly before serving. Using a cooking apparatus in which the cooking temperature can be set and monitored is essential to food safety. It is therefore yet a further object of the present invention to provide an electric grill which allows the user to control and monitor the temperature of the cooking surface and/or the food being grilled.

Accidents can also occur when such an appliance is located too close to another object during operation. Because of the intense heat emitted from the heating elements, objects close by are likely to be burnt. It is thus still a further object of the present invention to provide an electric grill in which this shortcoming can be mitigated.

The present invention provides an economic, safe and convenient electric grill which can at least mitigate the problems encountered in conventional grills as described above.

According to a first aspect of the present invention, there is provided an electric grill comprising an appertured heatable plate defining a cooking surface thereon, a residue collecting pan detachably receivable below the plate, and switch means adapted to activate the electric grill upon engagement of the residue collecting pan with the electric grill.

According to the second aspect of the present invention, there is provided an electric grill comprising an appertured heatable plate defining a cooking surface thereon, means for adjusting the heating of the plate, and temperature measuring means, wherein said temperature measuring means comprises visual display means for indicating a temperature detected by the temperature measuring means.

According to the third aspect of the present invention, there is provided an electric grill comprising an appertured heatable plate defining a cooking surface thereon, means for adjusting the heating of the plate and detachable temperature measuring means detachably engagable with the electric grill.

BRIEF DESCRIPTION OF DRAWINGS

Preferred embodiments of the invention will now be described, by way of example only, with reference to the following drawings in which:

FIG. 1b is a side view of the apparatus shown in FIG. 1a;

FIG. 1c is an end view of the apparatus shown in FIG. 1a;

FIG. 2 is a top view of the heating controller as removed from the electric grill apparatus shown in FIG. 1a;

FIG. 3a is a top view of a fry pan, being part of the electric grill shown in FIG. 1a;

FIG. 3b is a side view of the fry pan shown in FIG. 3a;

FIG. 3c is an end view of the fry pan shown in FIG. 3a;

FIG. 4a is a top view of the fry pan shown in FIG. 3a situated on the electric grill apparatus shown in FIG. 1a;

FIG. 4b is a side view of the fry pan and electric grill apparatus shown in FIG. 4a;

FIG. 4c is an end view of the fry pan and electric grill apparatus shown in FIG. 4a;

FIG. 5b is a cross sectional view of the electric grill apparatus taken along line A—A of FIG. 5a;

FIG. 5c is a cross sectional view of the electric grill apparatus taken along line B—B of FIG. 5a;

FIG. 6b is a side cross sectional view of FIG. 6a;

FIG. 7 is a perspective view of the electric grill apparatus shown in FIG. 4a;

FIG. 8b is an end view of the electric grill apparatus as shown in FIG. 8a.

DETAILED DESCRIPTION OF THE PREFERRED EMBODIMENT

Figure 1A:
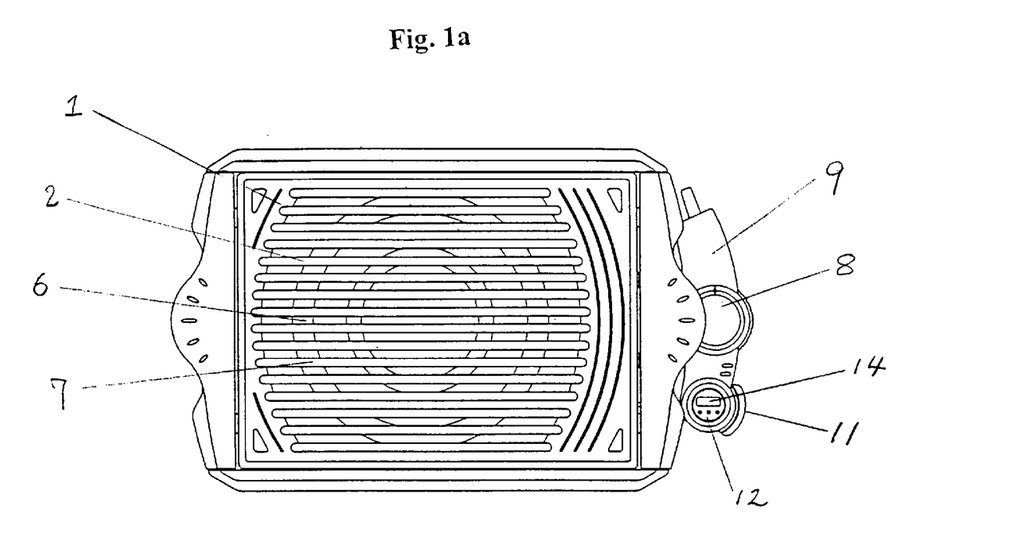
FIG. 1a is a top view of an electric grill according to the present invention.
Figure 1B:
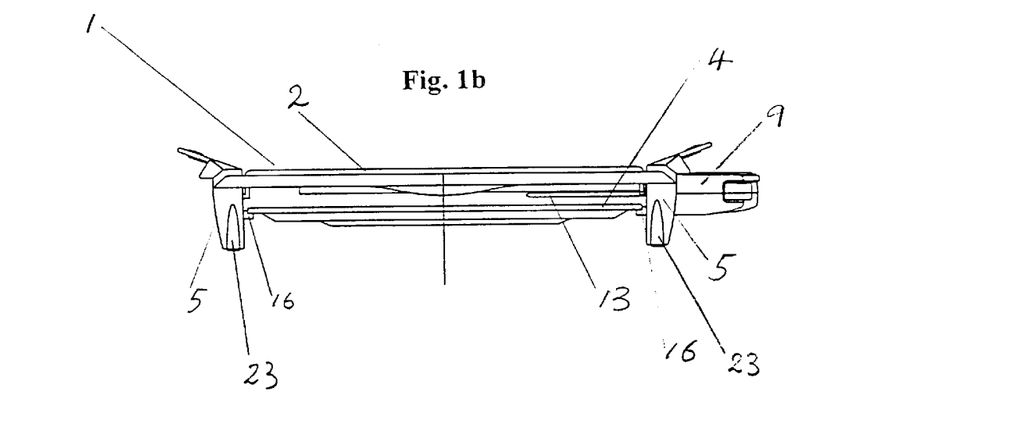
Figure 1C:
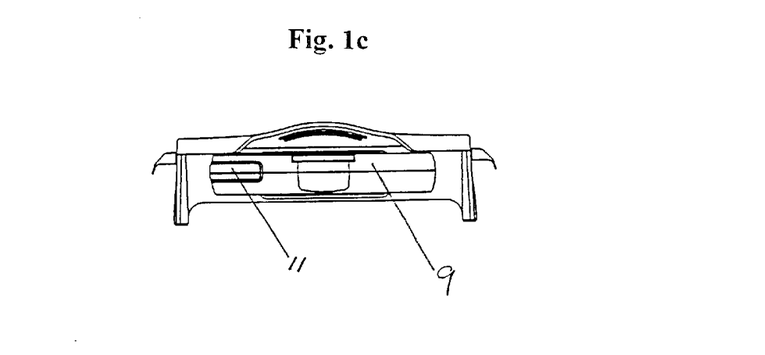

With reference to the drawings and in particular firstly to FIGS. 1a, 1b and 1c, an electric cooking grill or electric grill constructed according to an embodiment of the present invention essentially comprises a cooking plate or grilling plate 2 defining a cooking surface 1 on the upper surface thereof arranged between a pair of support members 5 and a detachable residue collecting pan 4 arranged thereunder.

The cooking plate 2 is a unitary cast metal plate formed of a material such as aluminum having an arrangement of parallel tubular or part-tubular portion 7 arranged over circular portions 6. The parallel arrangement of tubular or part-tubular portion 7 extends longitudinally across the cooking surface 1. The pattern of the cast metal plate is such as to facilitate heat transfer throughout the entire cooking plate 2. An electric heating element, which is not visible in the figures, is integrally cast inside the cooking plate 2, extending in a generally U-shaped pattern within the cooking plate 2.

A detachable heating controller 9 functioning as a heating control means is arranged at one end of the cooking grill as will be discussed in greater detail below. Detachment of the heating controller 9 allows the rest of the grill to be cleaned and washed without the risk of damage to the main electrical components.

Figure 2:
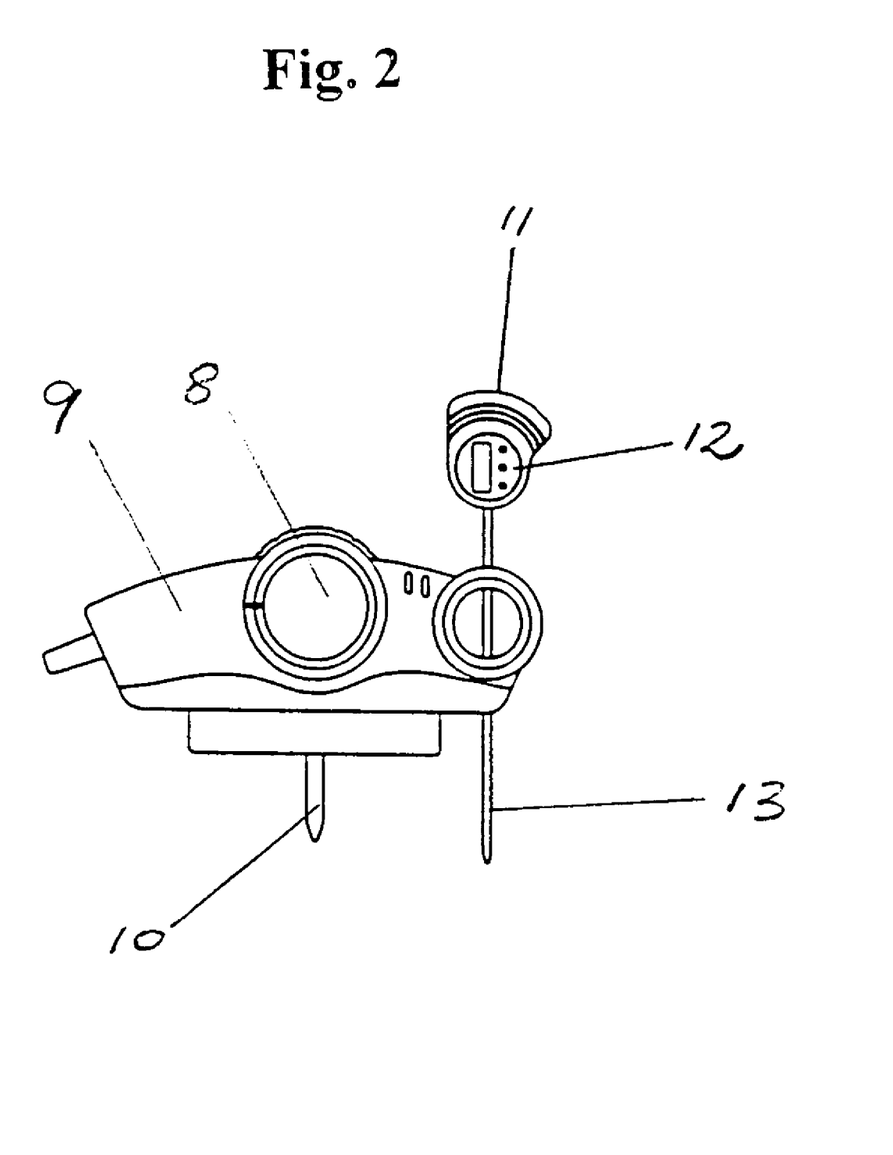

FIG. 2 shows the heating controller 9 as removed from the electric grill. The heating controller 9 includes a temperature measuring probe 11 having a liquid crystal display (LCD) portion 12 and a sensing portion 13. While an LCD display is used in this embodiment, any visual display means (for example, LED display) capable of indicating a temperature readout detected by the temperature measuring probe 11 can be used. The temperature measuring probe 11 functions as a temperature measuring means and is removably attached and mounted on the heating controller 9. The sensing portion 13 of the temperature measuring probe 11 is located underneath the cooking plate 2 when both the detachable heating controller 9 and the temperature measuring probe 11 are fully assembled onto the electric grill.

Figure 5A:
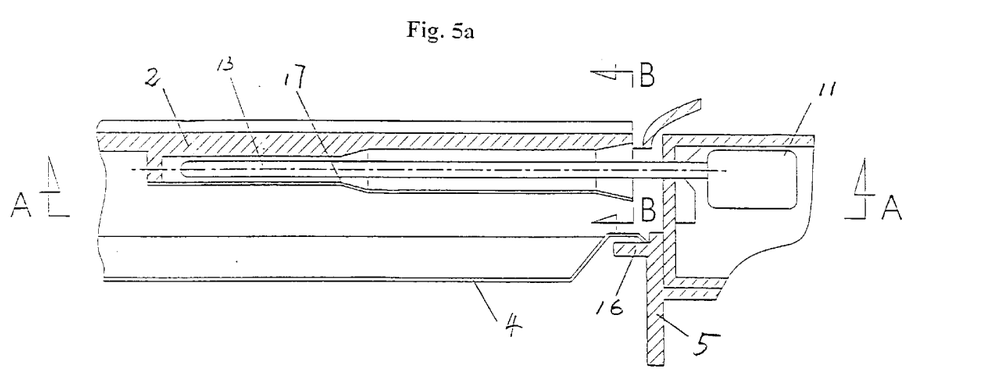
FIG. 5a is a cross sectional view of part of electric grill apparatus in FIG. 1a showing the temperature measuring probe.
Figure 5B:
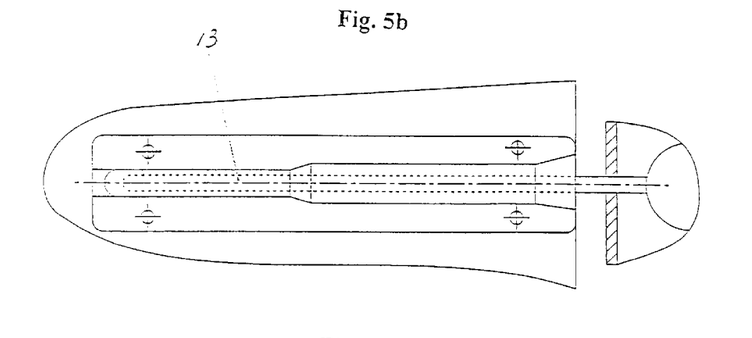
Figure 5C:
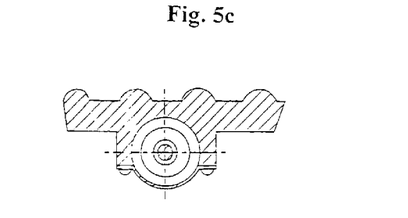
Figure 6A:
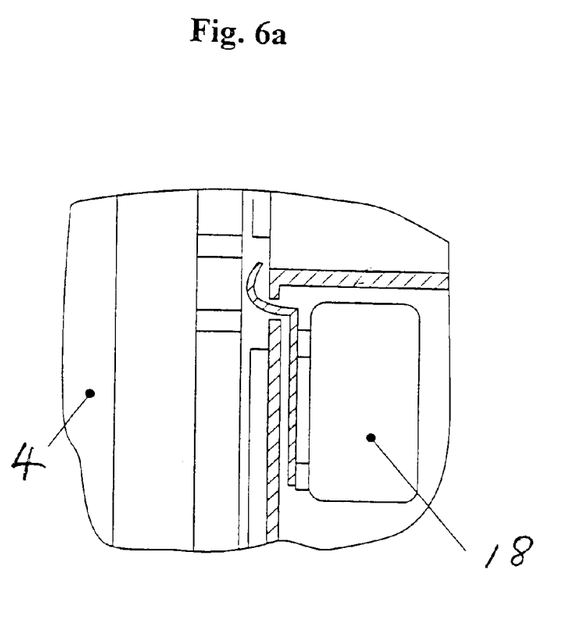
FIG. 6a is an enlarged top cross sectional view of part of the electric grill apparatus shown in FIG. 1a showing part of the residue collecting pan and the switch means.
Figure 6B:
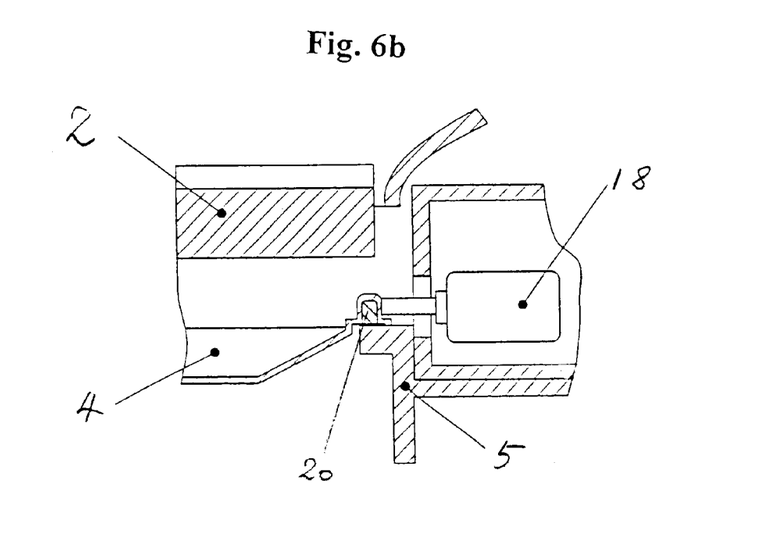
Figure 6C:
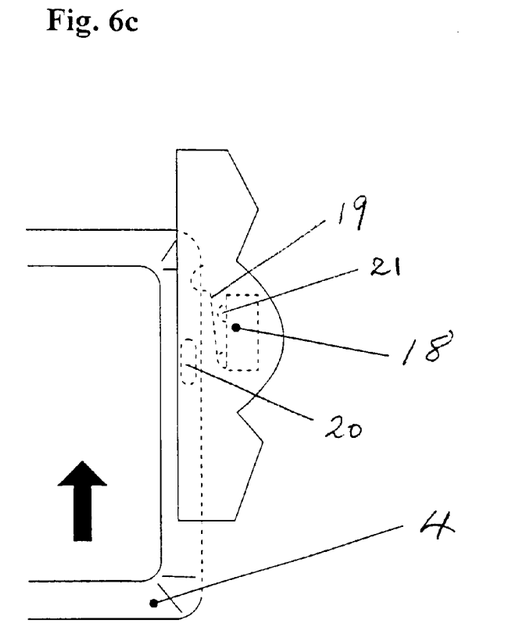
FIG. 6c is a top view showing the residue collecting pan being received into the electric grill.
Figure 6D:
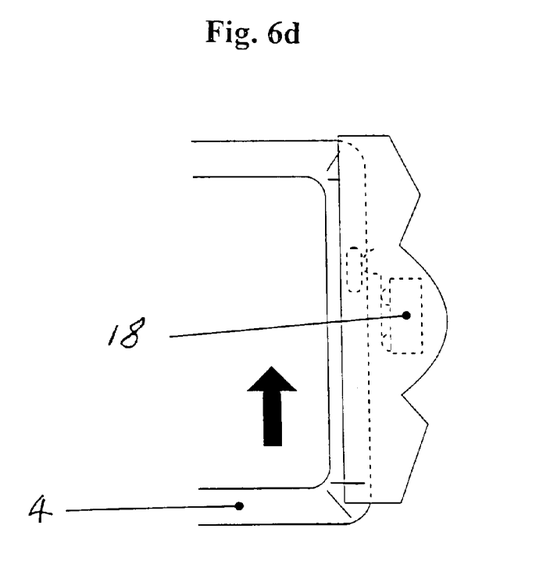
FIG. 6d is a top view showing the residue collecting pan fully received into the electric grill.
Figure 6E:
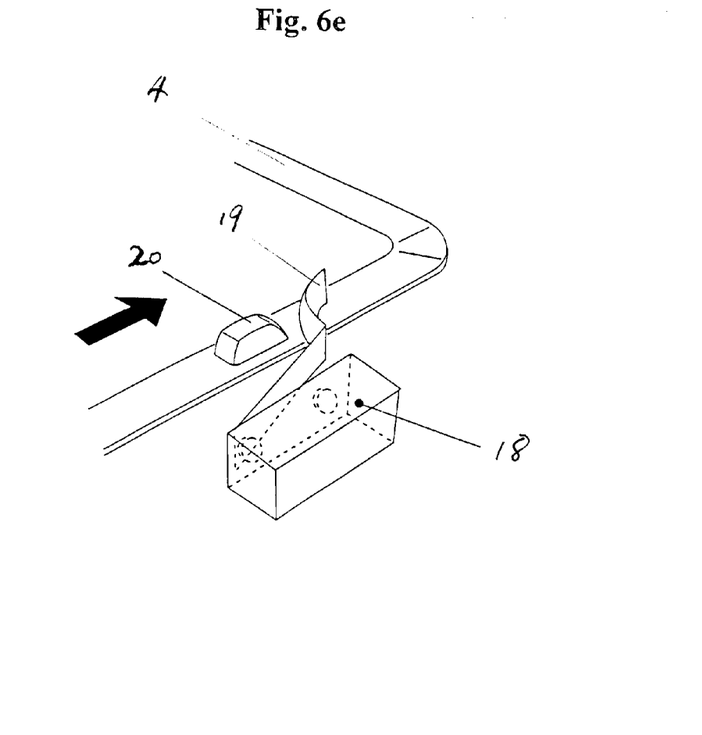
FIG. 6e is a perspective view showing the residue collecting pan being received into the electric grill.
Figure 6F:
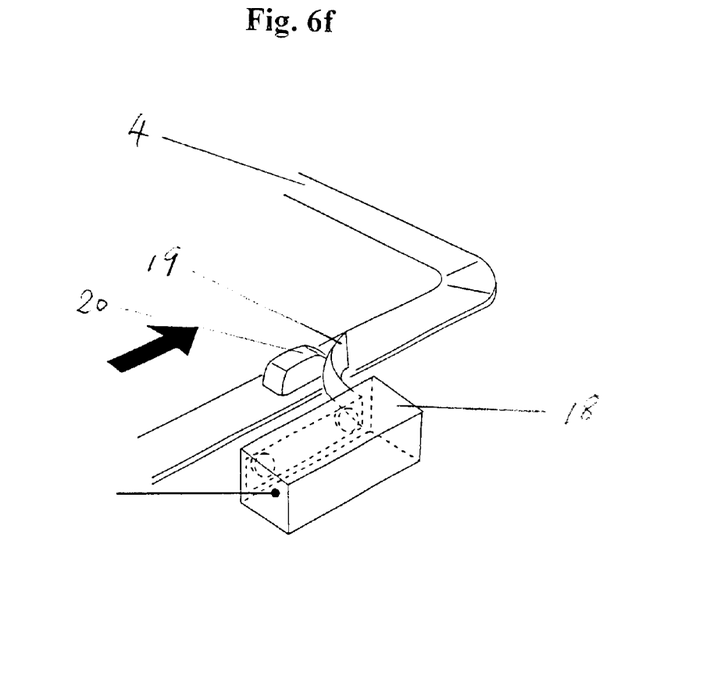
FIG. 6f is a perspective view of the residue collecting pan fully received into the electric grill.

FIGS. 5*a*, 5*b* and 5*c* show cross-sectional views of part of the electric cooking grill. Extending crosswise of the grill and secured to the support elements 5 are a pair of ledges 16, one of which is visible in FIG. 5*a*. A residue collecting pan 4 is removably located below the grill plate 2 and is supported at its edges on the ledges 16.

FIGS. 6*a*, 6*b*, 6*c*, 6*d*, 6*e* and 6*f* show an electric microswitch 18 functioning as a switch means to be triggered by the residue collecting pan 4. Arranged on a side of the residue collecting pan 4, which sits on the ledges 16, is a protrusion 20. The electric micro-switch 18 is located adjacent to one of the support members 5. The electric microswitch 18 has a resilent actuating arm 19 and a button switch 21. The actuating arm is biased away from the button switch 21. The button switch 21 is electrically connected to the heating controller 9. When the residue collecting pan 4 is slid under the cooking plate 2 with its edges being supported on the ledges 16, the protrusion 20 pushes the actuating arm 19 to contact and activate the button switch 21. Once the button switch 21 is activated, the electric micro-switch 18 is consequently activated and allows the cooking grill to be operated, but without this, the entire cooking grill is otherwise disabled. In particular, if the residue collecting pan 4 is not, or is not properly, engaged with the electric grill, the actuating arm 19 will be out of contact with the button switch 21, and the cooking grill will then be out of operation. This is to prevent the cooking grill from operating while the residue collecting pan 4 is not in place, which would otherwise allow fats and liquids from the food being cooked to drip on the table surface which is both dangerous and messy. This also prevents people from using some other kind of receptacle for the fats and liquids, which may be formed of an inappropriate material.

The detachable heating controller 9 provides the electrical connection between the supply of mains electricity and the heating element in the cooking plate 2. The detachable heating controller 9 also provides means for adjusting the heating of the cooking plate 2. The electric grill is in an operable state only when the detachable heating controller 9 is fully fitted into the electric grill. An electrical connection (not shown in figures) is located adjacent to the base of a pin member 10 which extends from the heating controller 9. The pin member 10 is receivable within an aperture below the cooking plate. The pin member 10 of the heating controller 9, when fitted makes electrical connection with a plug part at an end of the heating element. A temperature control switch 8, which comprises of a dial and a thermostat in a form of simple variable resistor (not shown in figures), allows the user to control the heating temperature of the cooking plate 2 by adjusting the dial. The connector pin 10 has a built-in feedback temperature sensor which senses the temperature of the cooking plate 2 during operation. According to the type of food to be cooked, the desired temperature can be adjusted by the user by using the dial of the temperature control switch 8. For instance, when a certain temperature setting of the temperature control switch 8 is set, the thermostat of the temperature control switch 8 of the beating controller 9 will be accordingly adjusted to allow the heating element to heat up to a certain temperature. Heat is then transferred by conduction from the heating element to the cooking plate 2. Once the desired temperature of the cooking plate 2 is detected by the temperature sensor of the pin member 10 as being reached, this desired temperature would be maintained.

When the temperature measuring probe 11 is fitted on the heating controller 9 while the electric grill is in an operable state. The temperature measuring probe 11 senses the temperature below the cooking plate 2. The temperature reading is shown on a liquid crystal display (LCD) screen 14 of the temperature measuring probe 11. As can be seen in FIGS. 5*a* and 5*b*, the temperature measuring probe 11 extends into an opening defined by a support plate 17 and the lower surface of the cooking plate 2 as shown in FIG. 5*a*. The user can then adjust the temperature control switch 8 based on the level of cooking required and the temperature reading of the LCD screen 14.

Alternatively, the temperature measuring probe 11 can be removed from the heating controller 9 and inserted directly into the food being cooked, and the temperature control switch 8 can be adjusted in consequence of the actual detected temperature of the food.

In this embodiment, both the heating controller 9 together with the temperature measuring probe 11 are detachable from the electric grill. As an alternative, the electric grill may be operable when the temperature measuring probe 11 is removed from the electric grill. While both the heating controller 9 and the temperature measuring probe 11 are detachable in this embodiment, in a different embodiment, the heating controller 9 and/or the temperature measuring probe 11 may be adapted to be fixedly attached to the electric grill.

To avoid the cooking grill being placed too close to surrounding objects such as an adjacent wall, spacers 23 protrude from the support elements 5 so that a minimum distance is maintained between the cooking grill and the surrounding objects.

Figure 3A:
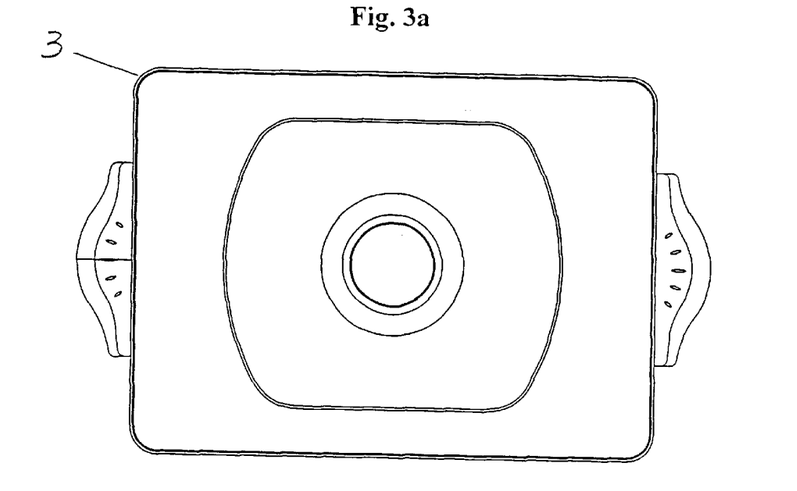

FIGS. 3a, b and c show a fry pan 3 which can be placed on top of the cooking plate 2. This fry pan 3 comprises a base 15 and a cover or lid 24. The inner cooking surface of the base 15 is substantially flat, making the fry pan 3 particularly suitable for frying of foods, for example eggs and meats. FIGS. 4a, b and c show the fry pan 3 as fitted onto the cooking plate 2. It can be arranged that both the cooking plate 2 and the underside of the fry pan 2 are formed with complimentary surfaces which engage closely with each other so as to allow for good heat transfer.

Figure 3B:
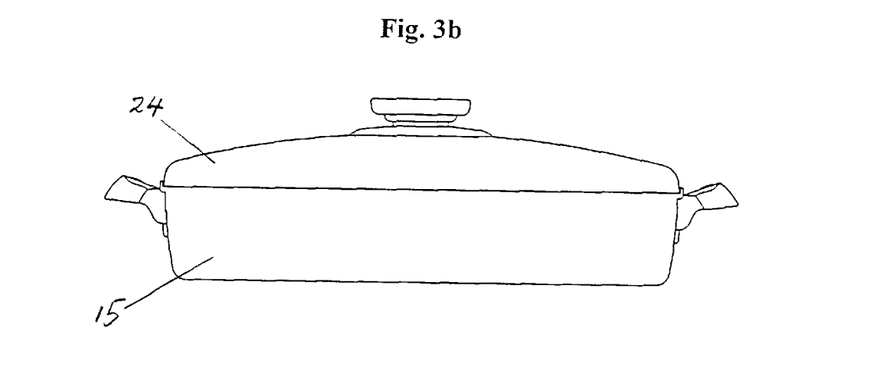
Figure 3C:
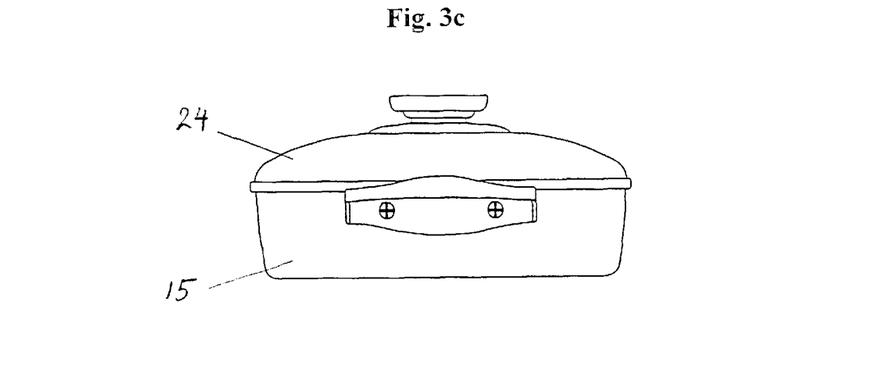
Figure 4A:
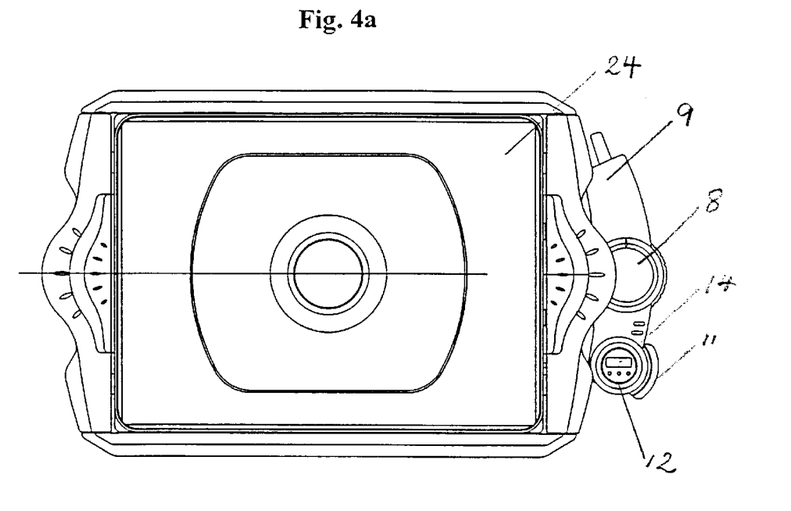
Figure 4B:
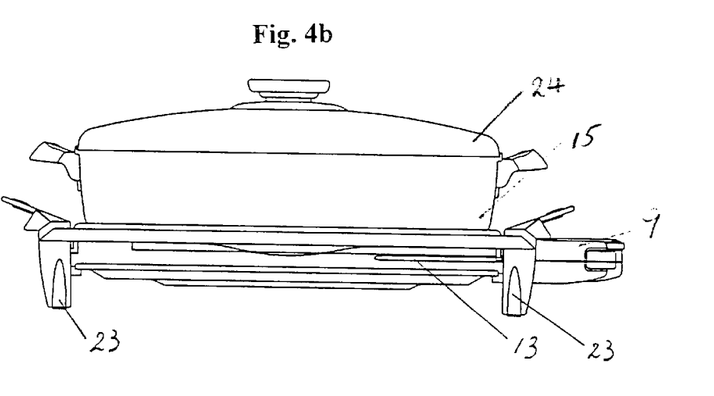
Figure 4C:
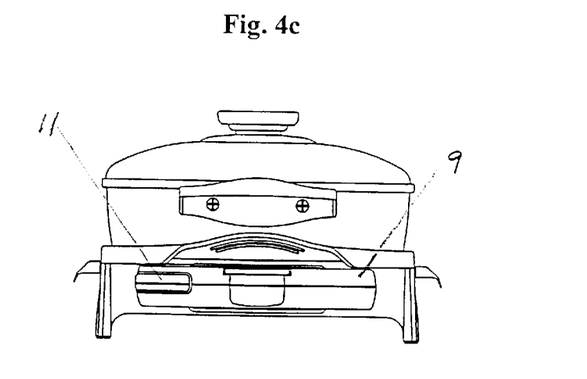
Figure 7:
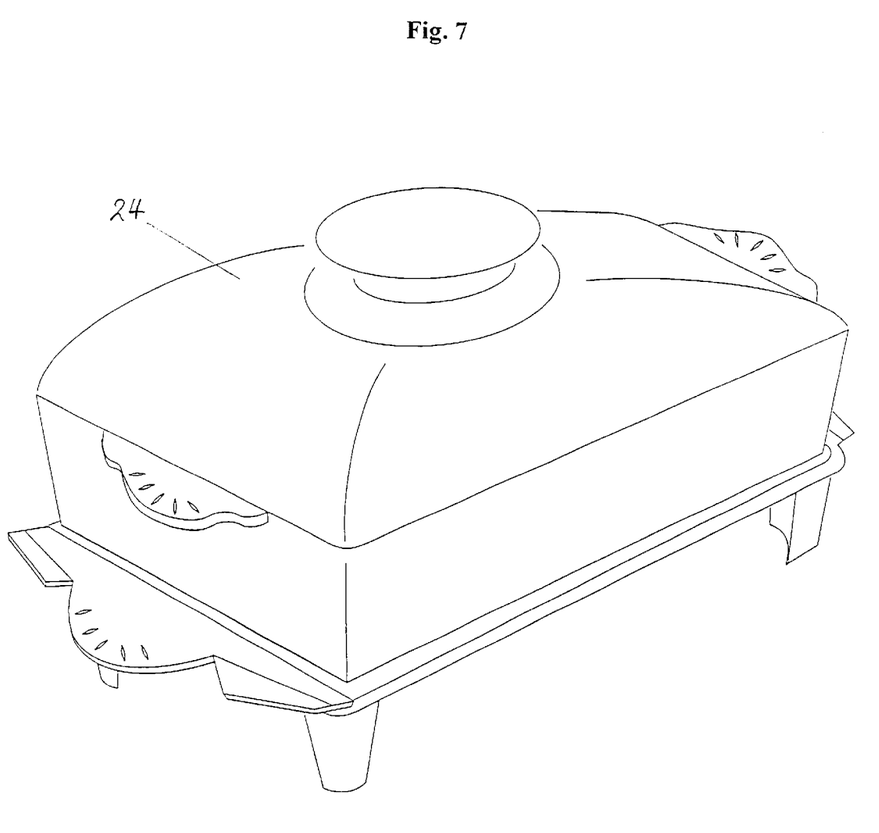
Figure 8A:
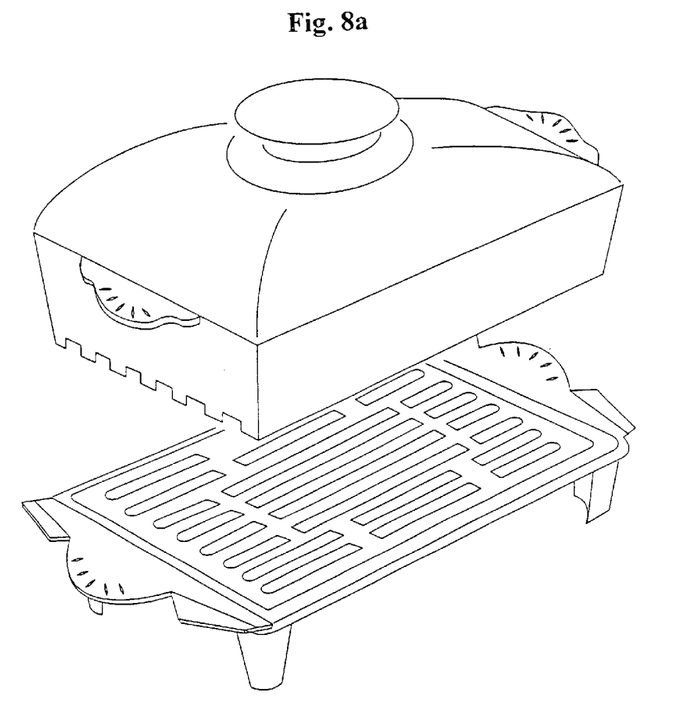
FIG. 8a is an exploded view of the electric grill apparatus as shown in FIG. 7.
Figure 8B:
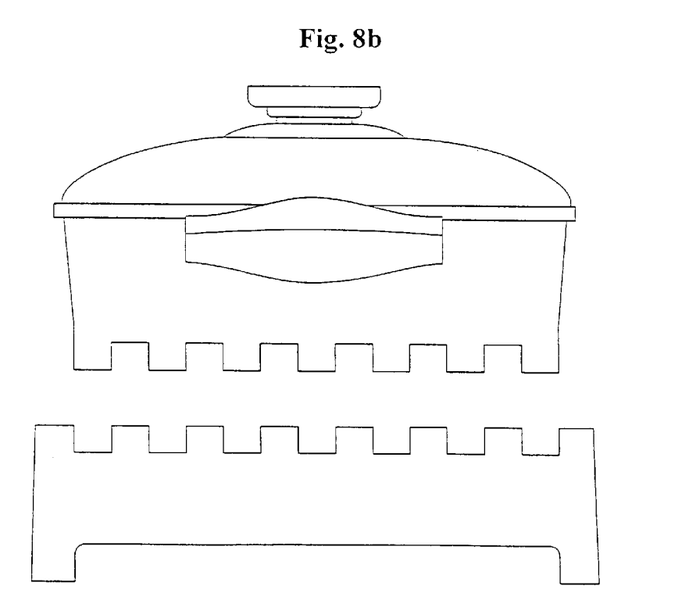

When the present invention is used in conjunction with a cover 22 or 24 as shown in FIGS. 3b, 7 and 8, the cooking grill can achieve a broiling effect. The cover 22 or 24 is preferably made of transparent glass so that the food can be checked regularly during cooking without lifting the cover.

Specific language is used above to describe the preferred embodiments. Nevertheless, no limitation of the scope of the invention is thereby intended, such alterations and such further applications of the principles of the invention as illustrated herein contemplated as would normally occur to one skilled in the art to which the invention relates.

The invention as described is deemed to incorporate equivalents to the integers recited where such equivalents would be apparent to those skilled in the art. The description is provided by way of example only.

What is claimed is:

1. An electric grill comprising an apertuated heatable plate defining a cooking surface thereon, a residue collecting pan detachably receivable below the plate, and switch means adapted to activate the electric grill upon engagement of the residue collecting pan with the said grill.

2. An electric grill as claimed in claim 1 further comprising means for adjusting the heating temperature of said plate.

3. An electric grill as claimed in claim 2 wherein said means for adjusting the heating temperature of said plate is detachable from said electric grill.

4. An electric grill as claimed in claim 1 further comprising at least one ledge for supporting said residue collecting pan when said residue collecting pan is engaged with said electric grill.

5. An electric grill as claimed in claim 1 wherein said residue collecting pan comprises at least one protrusion.

6. An electric grill as claimed in claim 5 wherein said actuating arm is movable by said protrusion when said residue collecting pan is received into said electric grill for engagement therewith.

7. An electric grill as claimed in claim 6 wherein said electric grill is in an operable state when said button switch of said switch means is activated.

8. An electric grill as claimed in claim 7 wherein said button switch is activatable when acted upon by said actuating arm.

9. An electric grill as claimed in claim 1 wherein said switch means comprises at least one actuating arm and a button switch.

10. An electric grill as claimed in claim 9 wherein said actuating arm is resilent and is biased away from said button switch.

11. An electric grill as claimed in claim 9 wherein said actuating arm is movable by said protrusion when said residue collecting pan is received into said electric grill for engagement therewith.

12. An electric grill as claimed in claim 1 further comprising a fry pan detachably engageable with said electric grill.

13. An electric grill as claimed in claim 12 wherein said fry pan includes a non-planar bottom surface complementing with said plate.

14. An electric grill as claimed in claim 1 further comprising support means which comprises at least one spacer member.

15. An electric grill comprising an apertured heatable plate defining a cooking surface thereon, means for adjusting the heating of said plate, and temperature measuring means, wherein said temperature measuring means comprises visual display means for indicating the temperature detected by said temperature measuring means, said visual display means being detachably mounted on said means for adjusting the heating of said plates.

16. An electric grill comprising an apertured heatable plate defining a cooking surface thereon, means for adjusting the heating of said plate, and temperature measuring means, wherein said temperature measuring means comprises visual display means for indicating the temperature detected by said temperature measuring means and said visual display means is adapted to display the temperature detected by said temperature measuring means underneath said plate.

17. An electric grill as claimed in claim 16 wherein said sensing portion of said temperature measuring means is at least partly insertable within the food being cooked for measuring its internal temperature.

18. An electric grill comprising an apertured heatable plate defining a cooking surface thereon, means for adjusting the heating of said plate, and temperature measuring means that comprises visual display means for indicating the temperature detected by said temperature measuring means, a residue collecting plan detachably receivable below said cooking plate, and switch means including at least one actuating arm and a button switch.

19. An electric grill as claimed in claim 18 wherein said actuating arm is moved by said protrusion when said residue collecting pan is received into said electric grill.

20. An electric grill as claimed in claim 18 wherein said electric grill is in an operable state when said button switch of said switch means is activated.

21. An electric grill as claimed in claim 18 wherein said button switch is activatable when acted upon by said actuating arm.

22. An electric grill as claimed in claim 18 further comprising a fry pan detachably engageable with said electric grill.

23. An electric grill as claimed in claim 22 wherein said fry pan includes a non-planar bottom surface complimenting with said plate.

24. An electric grill as claimed in claim 18 further comprising support means comprising at least one spacer member.

25. An electric grill comprising an apertured heatable plate defining a cooking surface thereon, means for adjusting the heating of said plate, and temperature measuring means detachably engageable with said grill, wherein said temperature measuring means comprises a display portion and a sensing portion and is detachably mounted on said means for adjusting the heating of said plate.

26. An electric grill as claimed in claim 25 wherein said sensing portion of said temperature sensing means is at least partly insertable within the food being cooked for sensing its internal temperature.

27. An electric grill as claimed in claim 25 further comprising a residue collecting pan detachably receivable below said cooking plate.

28. An electric grill as claimed in claim 27 further comprising at least one ledge for supporting said residue collecting pan when said residue collection pan is engaged with said electric grill.

29. An electric grill as claimed in claim 27 wherein said residue collecting pan comprises at least one protrusion.

30. An electrical gill comprising and apertured heatable plate defining a cooking surface thereon, means for adjusting the heating of said plate, and temperature measuring means detachably engageable with said grill wherein said temperature measuring mean comprises a sensing portion and a display portion that is adapted to display the temperature underneath said plate.

31. An electric grill comprising an apertured heatable plate defining a cooking surface thereon, means for adjusting the heating of said plate, temperature measuring means detachably engageable with said grill, and switch means including at lest one actuating arm and a button switch.

32. An electric grill as claimed in claim 31 wherein said actuating arm is moved by said protrusion when said residue collecting pan is received into said electric grill.

33. An electric grill as claimed in claim 31 wherein said electric grill is in an operable state when said button switch of said switch means is activated.

34. An electric grill as claimed in claim 33 wherein said button switch is activatable when acted upon by said actuating arm.

\* \* \* \* \*